(12) United States Patent
Takada

(10) Patent No.: US 11,410,279 B2
(45) Date of Patent: Aug. 9, 2022

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Yosuke Takada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 146 days.

(21) Appl. No.: 17/018,645

(22) Filed: Sep. 11, 2020

(65) Prior Publication Data

US 2021/0082089 A1 Mar. 18, 2021

(30) Foreign Application Priority Data

Sep. 13, 2019 (JP) .............................. JP2019-167259

(51) Int. Cl.
*G06T 5/00* (2006.01)
*G06T 7/13* (2017.01)

(52) U.S. Cl.
CPC ................ *G06T 5/002* (2013.01); *G06T 7/13* (2017.01); *G06T 2207/10024* (2013.01); *G06T 2207/20182* (2013.01)

(58) Field of Classification Search
CPC . G06T 5/002; G06T 7/13; G06T 2207/10024; G06T 2207/20182
See application file for complete search history.

(56) References Cited

U.S. PATENT DOCUMENTS

2012/0281923 A1\* 11/2012 Irani ................... G06K 9/6223
  382/218
2014/0153817 A1\* 6/2014 Lin ........................ G06V 10/75
  382/218

(Continued)

FOREIGN PATENT DOCUMENTS

JP 2013-26669 A 2/2013
JP 2015525648 A \* 9/2015
JP 2019106173 A \* 6/2019 ............... G06T 5/00

OTHER PUBLICATIONS

Liu et al. ("Single-Image Noise Level Estimation for Blind Denoising," IEEE Transactions on Image Processing, vol. 22, Issue 12, Dec. 2013; Date of Publication: Sep. 24, 2013) (Year: 2013).\*

(Continued)

*Primary Examiner* — Yubin Hung
(74) *Attorney, Agent, or Firm* — Canon U.S.A., Inc. I.P. Division

(57) ABSTRACT

An image processing apparatus includes a setting unit, a small region setting unit, a determination unit, a search unit, a noise reduction unit, and a synthesis unit. The setting unit sets a target patch in an input image. The small region setting unit sets a small region near the target patch. The determination unit determines a number of similar patches to be detected as a patch similar to the target patch based on a noise amount in the small region. The search unit searches the input image for the similar patch based on the number of similar patches. The noise reduction unit configured to perform noise reduction processing with respect to the target patch using the target patch and the similar patch. The synthesis unit generates an image by synthesizing a plurality of patch groups subjected to the noise reduction processing.

20 Claims, 13 Drawing Sheets

(56) References Cited

U.S. PATENT DOCUMENTS

2017/0263041 A1* 9/2017 Frosio .................... G09G 5/363
2018/0270479 A1* 9/2018 Chen ................... H04N 19/117
2019/0045224 A1* 2/2019 Huang ................ H04N 19/147

OTHER PUBLICATIONS

Katase et al. ("Image noise level estimation by searching for smooth patches with discrete cosine transform," IEEE 59th International Midwest Symposium on Circuits and Systems; Date of Conference: Oct. 16-19, 2016) (Year: 2016).*

Alkinani et al. ("Patch-based models and algorithms for image denoising: a comparative review between patch-based images denoising methods for additive noise reduction," EURASIP Journal on Image Video Process 2017 (1); Published online Aug. 24, 2017) (Year: 2017).*

Lu ("Good Similar Patches for Image Denoising," IEEE Winter Conference on Applications of Computer Vision; Date of Conference: Jan. 7-11, 2019) (Year: 2019).*

Tupin et al. ("Ten Years of Patch-Based Approaches for Sar Imaging: A Review," IEEE International Geoscience and Remote Sensing Symposium; Date of Conference: Jul. 28-Aug. 2, 2019) (Year: 2019).*

Gaston et al. ("A largest matching area approach to image denoising," IEEE International Conference on Acoustics, Speech and Signal Processing; Date of Conference: Mar. 20-25, 2016) (Year: 2016).*

Chatterjee et al. ("Patch-Based Near-Optimal Image Denoising," IEEE Transactions on Image Processing, vol. 21, Issue 4, Apr. 2012; Date of Publication: Oct. 19, 2011) (Year: 2011).*

Khan et al. ("Non-local Means using Adaptive Weight Thresholding," Proceedings of the 11th Joint Conference on Computer Vision, Imaging and Computer Graphics Theory and Applications (VISIGRAPP 2016), vol. 3) (Year: 2016).*

Lebrun, et al. Implementation of the \Non-Local Bayes (NL-Bayes) Image Denoising Algorithm, SIAM Journal on maging Science, Jun. 2013, pp. 1-42, vol. 3, Image Processing on Line.

* cited by examiner

FIG.7

| Z | 7 | 15 | 31 | ... |
|---|---|----|----|-----|
| β | 1 | 2  | 3  | ... |

IMAGE PROCESSING APPARATUS, IMAGE PROCESSING METHOD, AND STORAGE MEDIUM

BACKGROUND

Field of the Invention

The present disclosure relates to an image processing technique for processing a captured image.

Description of the Related Art

In recent years, there has been an increasing demand for an imaging apparatus such as a digital camera which can obtain a high-quality image, even in an environment such as a dark place and night time. In such an environment, it is necessary to perform high-sensitivity imaging. Since a sufficient signal to noise (SN) ratio cannot be obtained, an image quality is deteriorated by noise. Therefore, importance of a noise reduction technique has become recognized.

In this regard, it is widely known recently that a noise reduction method based on a patch (hereinbelow, referred to as "a patch-based method") is effective as discussed in Japanese Patent Application Laid-Open No. 2013-26669 and A. Buades, M. Lebrun, and J. M. Morel. Implementation of the "Non-local Bayes" (NL-Bayes) Image Denoising Algorithm. SIAM Journal on Imaging Science. 2013 (non-patent literature). The patch-based method is a technique for achieving noise reduction performance which is higher than the conventional technique by decomposing an image into partial regions (hereinbelow, referred to as "patch") and performing noise reduction processing using assembly of patches similar to an arbitrary target patch (hereinbelow, referred to as "similar patch").

However, conventional patch-based methods cannot obtain a good noise reduction effect unless a sufficient number of similar patches is collected. Yet, if the number of similar patches is excessively increased to improve the image quality, an adverse effect on the image quality, such as coloring on a flat portion and blurring of an edge, may occur in some cases.

SUMMARY

According to an aspect of the present disclosure, an image processing apparatus includes a setting unit configured to set a target patch in an input image, a small region setting unit configured to set a small region near the target patch, a determination unit configured to determine a number of similar patches to be detected as a patch similar to the target patch based on a noise amount in the small region, a search unit configured to search the input image for the similar patch based on the number of similar patches, a noise reduction unit configured to perform noise reduction processing with respect to the target patch using the target patch and the similar patch, and a synthesis unit configured to generate an image by synthesizing a plurality of patch groups subjected to the noise reduction processing.

Further features of the present disclosure will become apparent from the following description of exemplary embodiments with reference to the attached drawings.

BRIEF DESCRIPTION OF THE DRAWINGS

FIG. 7 illustrates processing for determining the number of similar patches according to the first exemplary embodiment.

DESCRIPTION OF THE EMBODIMENTS

Various exemplary embodiments of the present disclosure will be described in detail below with reference to the attached drawings. The exemplary embodiments described below do not necessarily limit the present disclosure.

Figure 1:
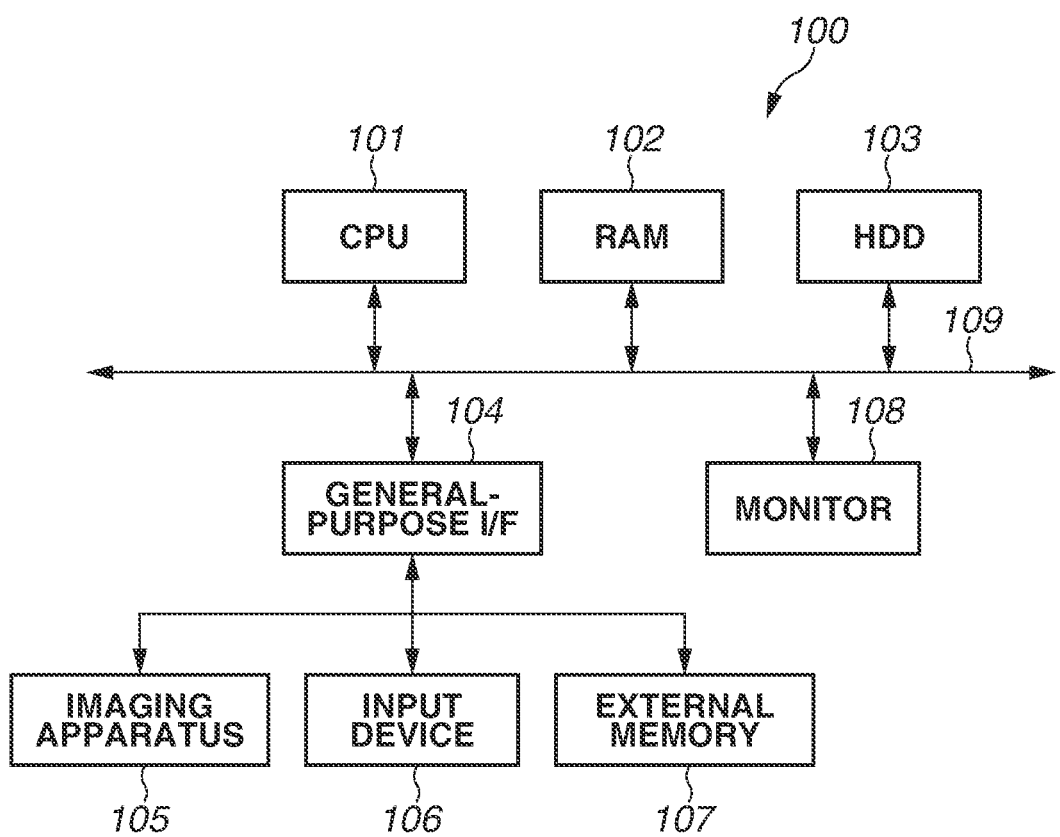
FIG. 1 illustrates a configuration example of an image processing apparatus.

FIG. 1 illustrates a schematic configuration example of an image processing apparatus 100 according to an exemplary embodiment. The image processing apparatus 100 according to the present exemplary embodiment includes a central processing unit (CPU) 101, a random access memory (RAM) 102, a hard disk drive (HDD) 103, a general-purpose interface (I/F) 104, a monitor 108, and a main bus 109. The general-purpose I/F 104 connects an imaging apparatus 105 such as a camera, an input device 106 such as a mouse and a keyboard, and an external memory 107 such as a memory card to the main bus 109. In addition to the HDD 103, various storage devices such as an optical disk and a flash memory can be used. The image processing apparatus 100 further includes components other than those described above, but the descriptions thereof are omitted.

The CPU 101 comprehensively controls each component via the main bus 109 and performs various types of information processing by executing various pieces of software (a computer program such as an operating system (OS) and an application program) stored in the HDD 103. In the following descriptions, image processing is described which is realized by the CPU 101 executing an image processing application program (hereinbelow, referred to as an image processing program) according to the present exemplary embodiment in the various pieces of software stored in the HDD 103.

The CPU 101 first starts the image processing program stored in the HDD 103 by loading it into the RAM 102 and displays a user interface (UI) screen on the monitor 108. Subsequently, the CPU 101 transfers various pieces of data stored in the HDD 103 and the external memory 107, image data captured by the imaging apparatus 105, an instruction from the input device 106, and the like to the RAM 102. Further, the CPU 101 executes various calculations with respect to data stored in the RAM 102 according to the processing of the image processing program. Then, the CPU 101 displays results of the calculations on the monitor 108 and stores them in the HDD 103 or the external memory 107. The image data stored in the HDD 103 and the external memory 107 may be transferred to the RAM 102. Image data transmitted from a server and the like via a network (not illustrated) may be transferred to the RAM 102.

Processing which is performed by the CPU 101 executing the image processing program to reduce noise in an image and output the image data after subjected to the noise reduction is described in detail below with reference to the configuration in FIG. 1.

A case in which the image processing apparatus 100 performs noise reduction processing using a partial region in an input image as a patch is described below as an example of the image processing according to a first exemplary embodiment. The image processing apparatus 100 according to the present exemplary embodiment adaptively determines the number of similar patches based on a target patch and a noise amount in a small region in a periphery of the target patch and thus realizes the noise reduction processing by which a suitable image quality can be obtained.

Figure 2:
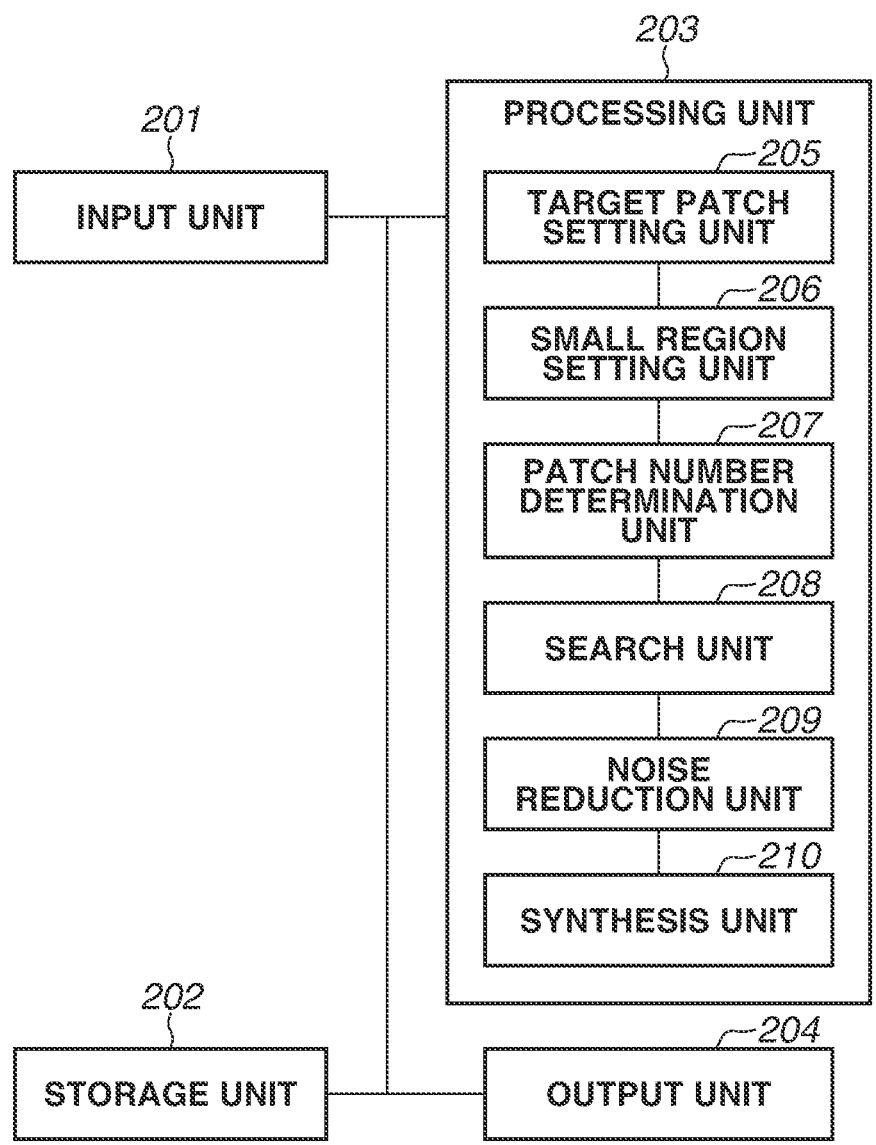
FIG. 2 is a block diagram illustrating a logical configuration of the image processing apparatus.

FIG. 2 is a block diagram illustrating a logical configuration of the image processing apparatus 100 according to the present exemplary embodiment illustrated in FIG. 1. As illustrated in FIG. 2, the image processing apparatus 100 according to the present exemplary embodiment includes an input unit 201, a storage unit 202, a processing unit 203, and an output unit 204. The processing unit 203 has functions of each of a target patch setting unit 205, a small region setting unit 206, a patch number determination unit 207, a search unit 208, a noise reduction unit 209, and a synthesis unit 210. Each component in the logical configuration is realized by the CPU 101 executing the image processing program according to the present exemplary embodiment.

In FIG. 2, the input unit 201 inputs image data and an image processing parameter to the image processing apparatus 100. Data to be input is data obtained from the imaging apparatus 105, the HDD 103, or the external memory 107. The input data to be obtained may be image data captured by the imaging apparatus 105 and temporarily stored in a storage device such as the HDD 103.

The storage unit 202 stores the image data and the image processing parameter obtained by the input unit 201 and image data as a result of image processing, in the RAM 102, the HDD 103, or the external memory 107 in FIG. 1. The storage unit 202 can read the stored data.

The processing unit 203 reads the image data and the image processing parameter from the input unit 201 or the storage unit 202 and performs image processing thereon. The processing unit 203 outputs a result of the image processing to the storage unit 202 and the output unit 204. The image processing performed by the processing unit 203 is described in detail below.

The output unit 204 outputs the image data as the result of the image processing by the processing unit 203, the image data stored in the storage unit 202, and the like to the monitor 108 and the HDD 103. An output destination is not limited to the above-described devices, and the data may be output to, for example, the external memory 107 connected to the general-purpose I/F 104, an external server (not illustrated), and a printer to be connected to the general-purpose I/F 104.

Figure 3:
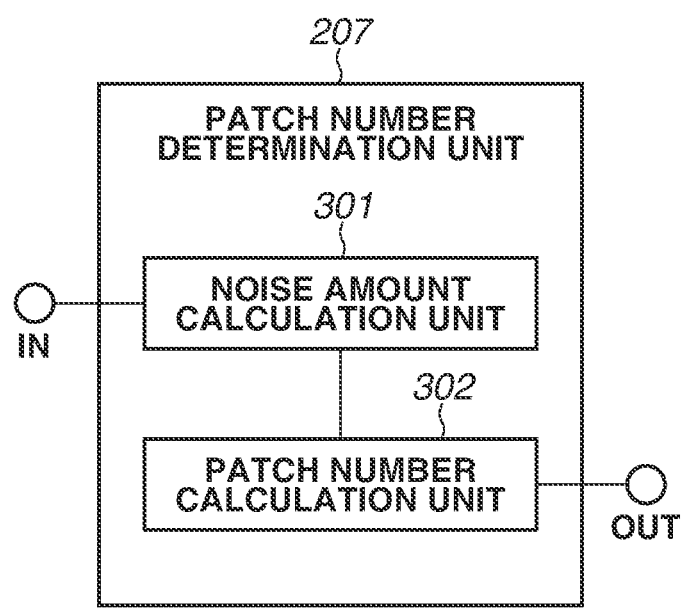
FIG. 3 is a block diagram illustrating a logical configuration of a patch number determination unit according to a first exemplary embodiment.

The patch number determination unit 207 in the processing unit 203 has functions of a noise amount calculation unit 301 and a patch number calculation unit 302 as illustrated in FIG. 3. These components are described in detail below.

Figure 4:
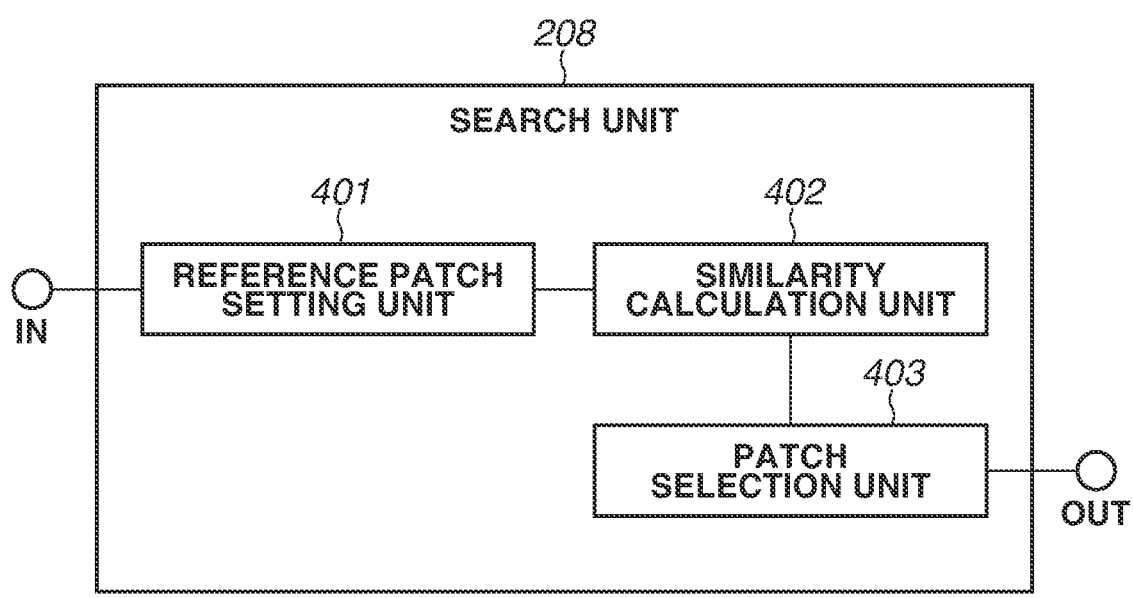
FIG. 4 is a block diagram illustrating a logical configuration of a search unit according to the first exemplary embodiment.

The search unit 208 has functions of a reference patch setting unit 401, a similarity calculation unit 402, and a patch selection unit 403 as illustrated in FIG. 4. These components are described in detail below.

Figure 5:
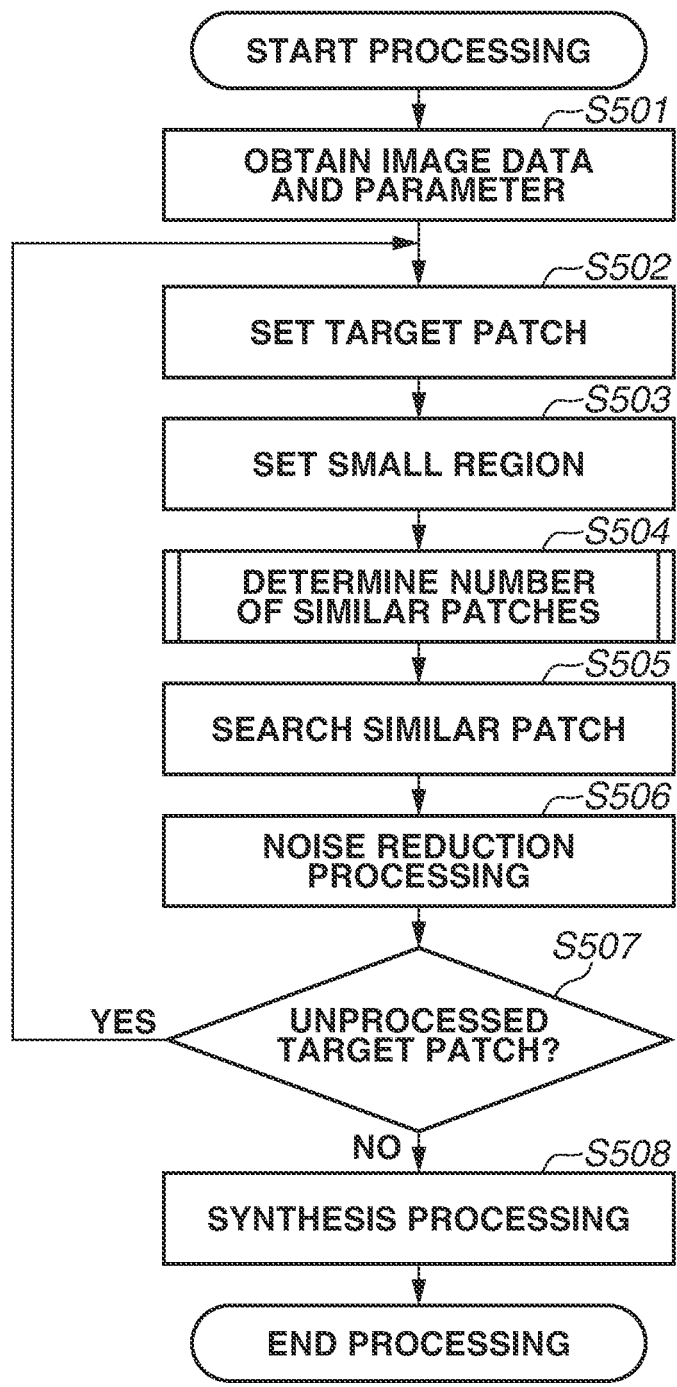
FIG. 5 is a flowchart illustrating a flow of image processing in the image processing apparatus.

The noise reduction processing according to the present exemplary embodiment is described below with reference to FIGS. 2 to 4 and a flowchart in FIG. 5. The processing in the flowchart illustrated in FIG. 5 is realized by the CPU 101 executing the image processing program according to the present exemplary embodiment.

In step S501, the input unit 201 obtains the input image data and the image processing parameter and stores them in the storage unit 202. The image processing parameter includes a size of a target patch and a size of a small region.

Next, in step S502, the target patch setting unit 205 sets the target patch having the size obtained in step S501 from the input image data which is a processing target. The target patch setting unit 205 sets the target patch in sequence so that all pixels to be subjected to the noise reduction processing in the input image data are included in the target patches. For example, the target patch setting unit 205 sets a patch having a predetermined size and shape based on a position thereof as the target patch by raster scanning in sequence with respect to all pixels in an input image. In order to reduce a processing time, it is effective to appropriately thin out the target patches.

Next, in step S503, the small region setting unit 206 sets a small region near the target patch from the input image data. According to the present exemplary embodiment, the small region setting unit 206 sets a rectangular region centering on the target patch as the small region.

Figure 6:
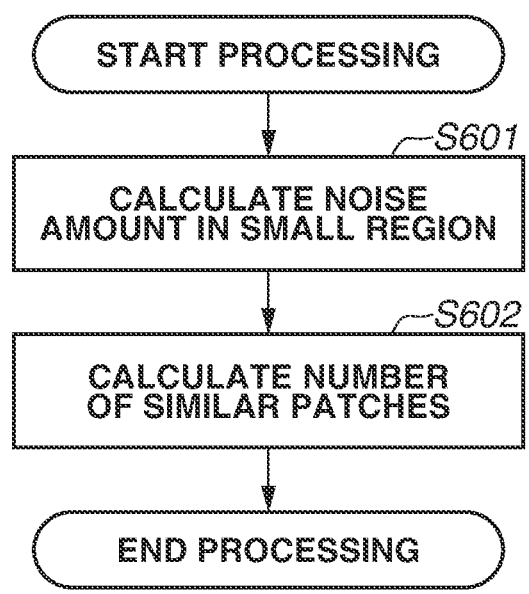
FIG. 6 is a flowchart illustrating a flow of processing for determining the number of similar patches according to the first exemplary embodiment.

Next, in step S504, the patch number determination unit 207 determines the number of similar patches based on a noise amount in the small region. A procedure for determining the number of similar patches is described with reference to a configuration of the patch number determination unit 207 in FIG. 3 and a flowchart in FIG. 6.

In step S601, the noise amount calculation unit 301 in the patch number determination unit 207 calculates variance of pixel values in the small region as the noise amount. At this time, the noise amount calculation unit 301 detects an edge pixel in the small region using a differential filter such as a Laplacian filter and calculates the variance from pixels excluding the edge pixel. The method for calculating the noise amount is not limited to the above-described one and may be any method as long as it is an index capable of indicating the noise amount in the small region.

Next, in step S602, the patch number calculation unit 302 calculates the number of similar patches based on the noise amount in the small region, the size of the target patch, and a size of a search region for searching the similar patch. The size of the search region is determined based on the size of the target patch and is, for example, n-times+1 the size of the target patch (n=5 in the present exemplary embodiment). The method for calculating the size of the search region is not limited to the above-described one, and a value input as the image processing parameter may be used. Further, the patch number calculation unit 302 calculates three elements and then calculates the number of similar patches by following Formula (1).

$$N = \beta \cdot p \cdot \sigma^2 \qquad \text{Formula (1)}$$

Figure 7:
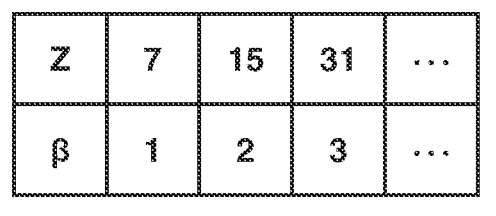

In Formula (1), N is the number of similar patches, p is the size of the target patch, $\sigma^2$ is the noise amount in the small region, and $\beta$ is calculated with reference to a coefficient corresponding to a size Z of the search region from a look-up table (LUT) prepared in advance as illustrated in FIG. 7. As the noise amount $\sigma^2$ increases, the number of similar patches N increases in order to reduce the noise. For example, in a case of p=6, $\sigma^4$=4, and Z=31, N=72 is obtained, and in a case of p=6, $\sigma^2$=6, and Z=31, N=108 is obtained. In this regard, it is necessary to set the minimum required number of similar patches to calculate a covariance matrix in the noise reduction processing in a later stage, and this number is calculated by $p^2+1$. In order to reduce a calculation cost, a noise amount measured in advance for each International Organization for Standardization (ISO) sensitivity may be used instead of dynamically calculating the noise amount in the small region.

Returning to the description of the flowchart in FIG. 5, in step S505, the search unit 208 searches the input image for the similar patches, based on the number of similar patches. Therefore, in the search unit 208, the reference patch setting unit 401 in FIG. 4 first extracts a plurality of reference patches from the input image data. The reference patch is a patch included in a certain coordinate range determined based on the target patch and has a same size and a same shape as the target patch. The reference patches may overlap with each other. For example, the reference patch setting unit 401 sets all patches at positions shifted from the target patch by a distance within W pixels in horizontal and vertical directions as the reference patches.

Next, the similarity calculation unit 402 calculates a similarity between the target patch and each reference patch. As the similarity, a similarity distance such as a sum of squared difference (SSD) and a sum of absolute difference (SAD) of each pixel in a patch can be used.

The patch selection unit 403 selects N pieces of the reference patches as the similar patches from the reference patches based on the similarity. As a method for selecting the similar patch, for example, the patches are sorted by the similarity distance, and only top N pieces of patches are selected as the similar patches.

Next, in step S506, the noise reduction unit 209 performs the noise reduction processing on the input patch group. An arbitrary patch-based method can be used as the noise reduction processing. According to the present exemplary embodiment, a case is described as an example in which the method discussed in Implementation of the "Non-local Bayes" (NL-Bayes) Image Denoising Algorithm (the non-patent literature) is used. The noise reduction unit 209 generates a matrix P representing a patch group as an assembly of the target patch and the similar patches as expressed in Formula (2). In Formula (2), $x_0$ represents the target patch, and $x_1$ to $x_N$ represent column vectors in which pixel values of the similar patches are arranged respectively. The noise reduction unit 209 generates a matrix $P_m$ by repeating, for N+1 columns, an average patch obtained by averaging the matrix P in a row (horizontal) direction as expressed in Formula (3). Further, the noise reduction unit 209 calculates a covariance matrix C as expressed in Formula (4). The noise reduction unit 209 calculates an assembly Pd of patches in which noise is reduced using the covariance matrix C according to Formula (5). According to the above-described arithmetic processing, a noise reduced patch group is generated in which noise is reduced from each patch in the input patch group.

$$P = [\, x_0 \quad x_1 \quad \ldots \quad x_N \,] \qquad \text{Formula (2)}$$

$$P_m = [\, \overline{P} \quad \ldots \quad \overline{P} \,] \qquad \text{Formula (3)}$$

$$\overline{P} = \frac{1}{N+1} \sum_{n=0}^{N} x_k$$

$$C = (1/N)(P - P_m)(P - P_m)^T \qquad \text{Formula (4)}$$

In Formula (4), T represents a transpose of a matrix.

$$P_d = P - \nu C^{-1}(P - P_m) \qquad \text{Formula (5)}$$

The method discussed in the non-patent literature performs processing in two stages to obtain a further noise reduction effect. Therefore, the noise reduction unit 209 generates a patch group in which noise is reduced by performing the arithmetic processing from Formula (2) to Formula (5) on each target patch and generates a first image in which noise is reduced by patch integration processing as the processing in the first stage. Subsequently, the noise reduction unit 209 performs the similar processing using a first noise reduced image generated in the first stage as an input image and thus generates a second noise reduced image as the processing in the second stage.

According to the above-described method, it is assumed that a matrix obtained by subtracting "v" from a diagonal component in the covariance matrix C is a good approximation to a covariance matrix $C_0$ similarly calculated with respect to a noise reduced patch group as expressed in Formula (6).

$$C_0 \approx C - \nu I \qquad \text{Formula (6)}$$

In Formula (6), I represents an identity matrix. Approximation accuracy of Formula (5) is improved as the number of similar patches N is increased. More specifically, an error of each element on a right side of Formula (5) with respect to the covariance matrix $C_0$ is inversely proportional to a square root of (N+1) according to a law of large numbers. Therefore, increasing the number of similar patches N improves estimation accuracy of the assembly Pd by Formula (4), and consequently, the noise reduction performance is improved.

Next, in step S507, the target patch setting unit 205 determines whether there is an unprocessed target patch. In a case where it is determined that there is the unprocessed target patch (YES in step S507), the target patch setting unit 205 returns the processing to step S502. Otherwise (NO in step S507), the target patch setting unit 205 advances the processing to step S508. In order to reduce the processing time, a method may be adopted in which a patch once selected as the similar patch is not selected as the target patch thereafter.

In step S508, the synthesis unit 210 generates a noise reduced image using the noise reduced patch groups. The noise reduced patch groups can overlap with each other. Therefore, it is necessary to determine one value obtained by integrating pixel values from a plurality of output patches with respect to each pixel. According to the method discussed in the non-patent literature, an average value of the pixel values from the plurality of output patches is output to each pixel, but it is not limited to this method.

Next, a second exemplary embodiment is described. According to the above-described first exemplary embodiment, the number of similar patches is determined based on the noise amount calculated from the small region including the target patch. According to the second exemplary embodiment, the number of similar patches is determined using a noise amount measured in advance for each ISO sensitivity and a noise amount in the small region. An apparatus configuration and a processing flow similar to those according to the above-described first exemplary embodiment are omitted from illustration and description.

Figure 8:
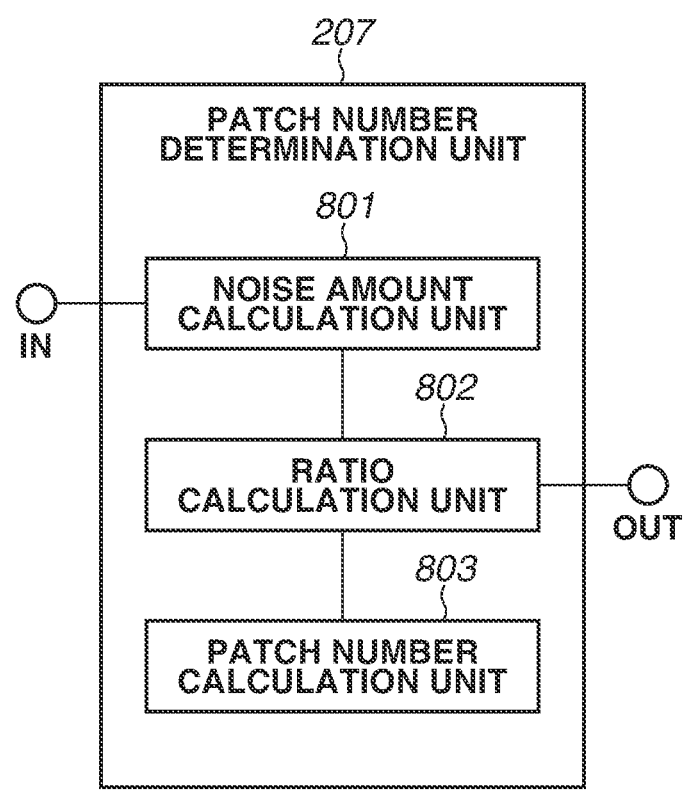
FIG. 8 is a block diagram illustrating a logical configuration of a patch number determination unit according to a second exemplary embodiment.
Figure 9:
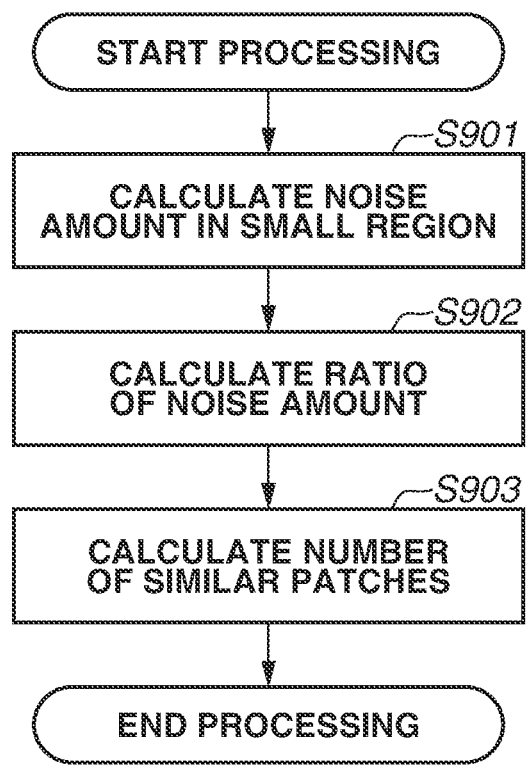
FIG. 9 is a flowchart illustrating a flow of processing for determining the number of similar patches according to the second exemplary embodiment.

Processing performed by a patch number determination unit 207 according to the second exemplary embodiment is described below with reference to a block diagram in FIG. 8 and a flowchart in FIG. 9. FIG. 8 is the block diagram illustrating a logical configuration of the patch number determination unit 207 according to the second exemplary embodiment. FIG. 9 is the flowchart illustrating processing for determining the number of similar patches according to the second exemplary embodiment.

As illustrated in FIG. 8, the patch number determination unit 207 according to the second exemplary embodiment has functions of a noise amount calculation unit 801, a ratio calculation unit 802, and a patch number calculation unit 803. The noise amount calculation unit 801 is similar to the noise amount calculation unit 301 according to the first exemplary embodiment.

First, in step S901, the noise amount calculation unit 801 calculates variance $\sigma^2$ of pixel values in the small region.

Next, in step S902, the ratio calculation unit 802 calculates a variance ratio R by dividing the variance $\sigma^2$ by noise variance $\sigma_0^2$ measured for each ISO sensitivity.

Next, in step S903, the patch number calculation unit 803 calculates the number of similar patches N by Formula (7) based on the variance ratio R in the small region, the size of the target patch, and the size of the search region for searching the similar patch.

$$N = (\beta \cdot p^2)/R \qquad \text{Formula (7)}$$

Formula (7) expresses that the number of similar patches becomes larger as the variance ratio R becomes smaller. This is because the smaller a variance ratio R, the poorer a texture in the small region (a flat portion), and it is necessary to increase the number of similar patches in the flat portion.

Next, a third exemplary embodiment is described. According to the first and the second exemplary embodiments described above, the number of similar patches is determined based on the noise amount in the small region including the target patch. According to the third exemplary embodiment, the number of similar patches is determined using not only the noise amount in the small region but also information included in the small region as auxiliary information. An apparatus configuration and a processing flow similar to those according to the above-described first exemplary embodiment are omitted from illustration and description.

Figure 10:
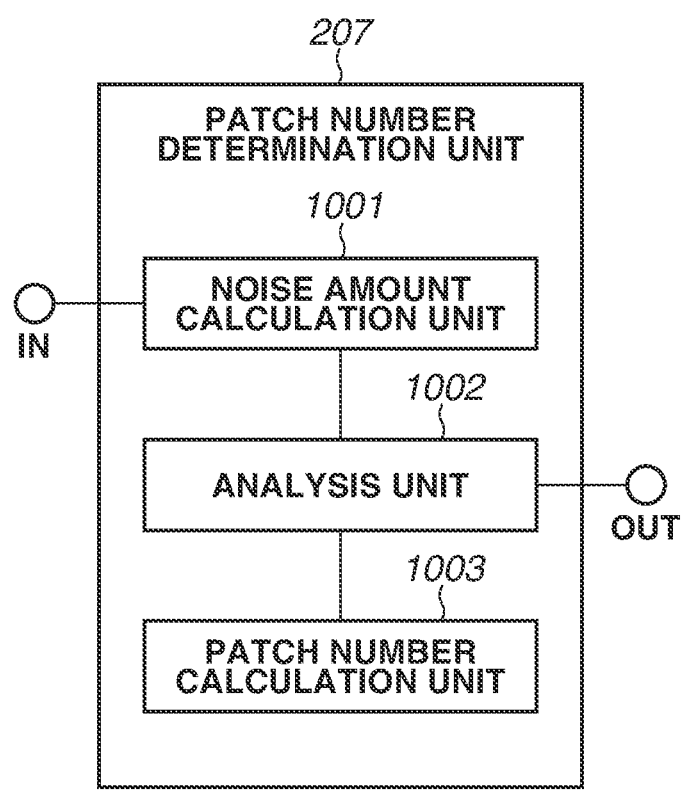
FIG. 10 is a block diagram illustrating a logical configuration of a patch number determination unit according to a third exemplary embodiment.
Figure 11:
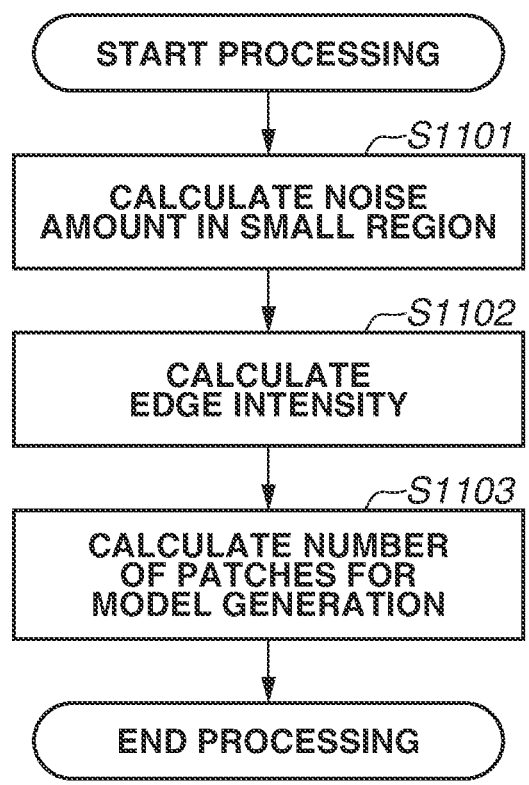
FIG. 11 is a flowchart illustrating a flow of processing for determining the number of similar patches according to the third exemplary embodiment.

Processing performed by a patch number determination unit 207 according to the third exemplary embodiment is described below with reference to a block diagram in FIG. 10 and a flowchart in FIG. 11. FIG. 10 is the block diagram illustrating a logical configuration of the patch number determination unit 207 according to the third exemplary embodiment. FIG. 11 is the flowchart illustrating processing for determining the number of similar patches according to the third exemplary embodiment.

As illustrated in FIG. 10, the patch number determination unit 207 according to the third exemplary embodiment has functions of a noise amount calculation unit 1001, an analysis unit 1002, and a patch number calculation unit 1003. The noise amount calculation unit 1001 is similar to the noise amount calculation unit 301 according to the first exemplary embodiment.

First, in step S101, the noise amount calculation unit 1001 calculates the noise amount in the small region. The calculation method is similar to that according to the first exemplary embodiment.

Next, in step S1102, the analysis unit 1002 calculates an edge intensity in the small region.

Next, in step S103, the patch number calculation unit 1003 calculates the number of patches for model generation which is obtained by Formula (8) adding the edge intensity to Formula (1).

$$N = (\beta \cdot p \cdot \sigma^2)/(w \cdot E) \qquad \text{Formula (8)}$$

In Formula (8), E is an edge intensity, and w is a weight. According to Formula (8), the number of similar patches N becomes larger as the edge intensity E becomes smaller. This is because the smaller an edge intensity E, the poorer a texture in the small region (a flat portion), and it is necessary to increase the number of similar patches in the flat portion.

According to the present exemplary embodiment, the edge intensity is used as the auxiliary information, however, a method is not limited to the above-described one. A direction of the edge, an analysis value of a differential value, and a representative value of a high-frequency component in a Fourier spectrum can be used as the auxiliary information. A differential value is a difference value between adjacent pixels in the horizontal direction or the vertical direction. As the analysis value of the differential value, a norm for a vector in which the differential values are arranged and a singular value obtained by performing singular value decomposition on a matrix in which differential values in the horizontal direction or in the vertical direction are arranged can be used.

Next, a fourth exemplary embodiment is described. According to the first and the second exemplary embodiments, the number of patches for model generation is determined based on the noise amount in the small region. According to the third exemplary embodiment, the number of patches for model generation is determined using not only the noise amount but also the auxiliary information included in the small region. According to the fourth exemplary embodiment, the number of similar patches is determined using not only the noise amount in the small region but also saturation as auxiliary information. An apparatus configuration and a processing flow similar to those according to the above-described first exemplary embodiment are omitted from illustration and description.

Figure 12:
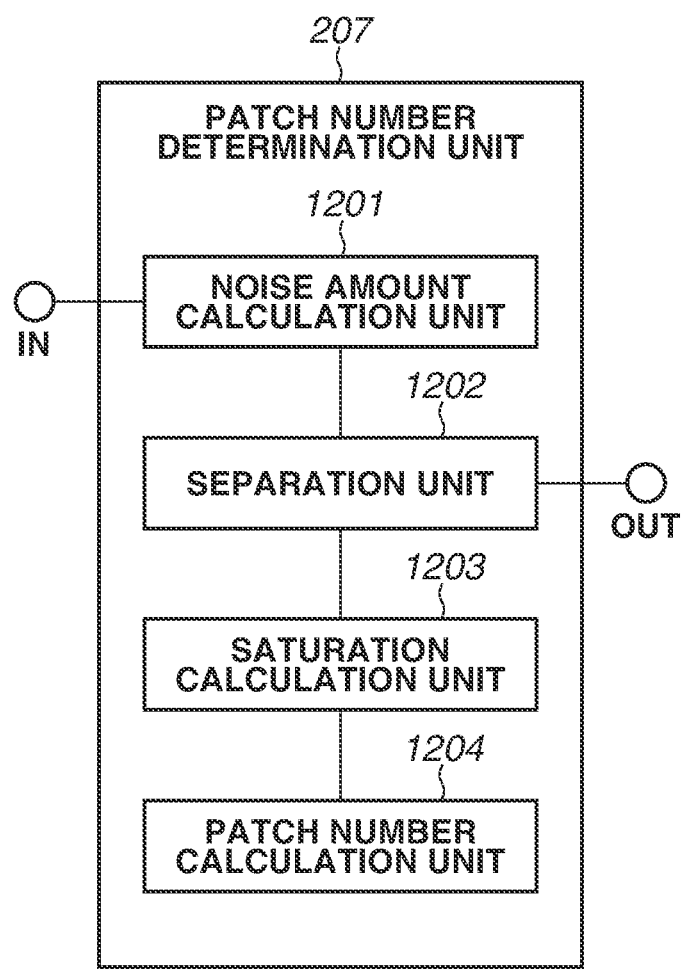
FIG. 12 is a block diagram illustrating a logical configuration of a patch number determination unit according to a fourth exemplary embodiment.
Figure 13:
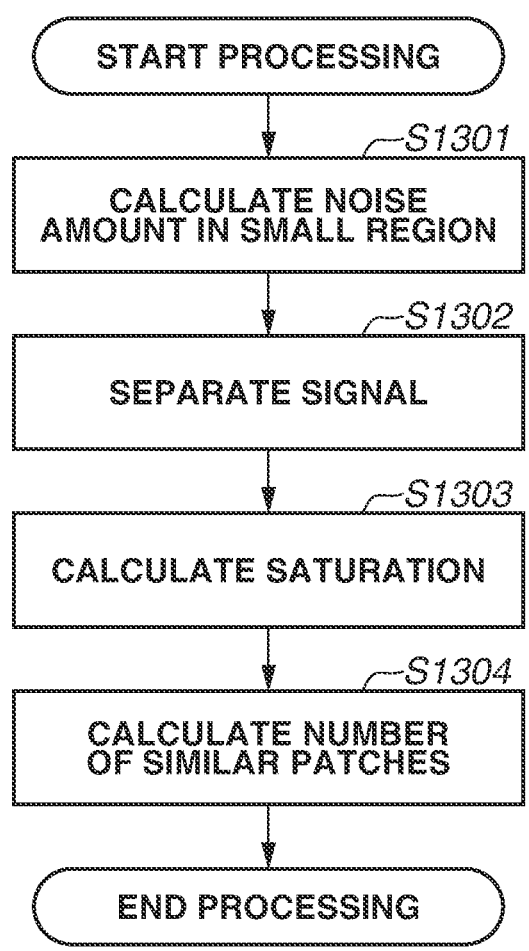
FIG. 13 is a flowchart illustrating a flow of processing for determining the number of similar patches according to the fourth exemplary embodiment.

Processing performed by an image processing apparatus according to the fourth exemplary embodiment is described below with reference to a block diagram in FIG. 12 and a flowchart in FIG. 13. FIG. 12 is the block diagram illustrating a logical configuration of a patch number determination unit 207 according to the fourth exemplary embodiment. FIG. 13 is the flowchart illustrating processing for determining the number of similar patches according to the fourth exemplary embodiment.

As illustrated in FIG. 12, the patch number determination unit 207 according to the fourth exemplary embodiment has functions of a noise amount calculation unit 1201, a separation unit 1202, a saturation calculation unit 1203, and a patch number calculation unit 1204. The noise amount calculation unit 1201 is similar to the noise amount calculation unit 301 according to the first exemplary embodiment.

First, in step S1301, the noise amount calculation unit 1201 calculates the noise amount in the small region. The calculation method is similar to that according to the first exemplary embodiment.

Next, in step S1302, the separation unit 1202 separates red (R), green (G), and blue (B) signals of each pixel in the small region into a luminance signal Y and the color difference signals U and V.

Next, in step S1303, the saturation calculation unit 1203 calculates saturation for each pixel from the luminance signal Y and the color difference signals U and V.

Then, in step S1304, the patch number calculation unit 1204 calculates the number of similar patches which is obtained by Formula (9) adding average saturation of the small region to Formula (1).

$$N = k \cdot C \cdot \beta \cdot p \cdot \sigma^2 \quad \text{Formula (9)}$$

In Formula (9), k is a weight, and C is the average saturation of the small region. According to Formula (9), the number of similar patches N becomes larger as the saturation becomes larger. The average saturation is an average value of the saturation of all pixels in the small region.

According to the present exemplary embodiment, the saturation in the small region is used as the auxiliary information, but saturation of the target patch may be used. In addition, the RGB signals of the input image data may be separated into the luminance signal Y and the color difference signals U and V in advance and then returned to the RGB signals by performing the noise reduction processing based on the number of similar patches calculated with respect to each signal. At that time, in a case where the saturation is a determination value (th) or more, the number of similar patches for the color difference signals U and V are increased more than the number of similar patches for the luminance signal Y. This is because, the noise amount in the color difference signal is increased as the saturation becomes higher, and many similar patches are required to reduce the noise amount.

As described above, according to each exemplary embodiment of the present disclosure, a suitable image quality can be obtained by appropriately determining the number of similar patches in the noise reduction processing according to the patch-based method.

Each exemplary embodiment of the present disclosure has been described above, but the present disclosure is not limited to the specific exemplary embodiments and can include various embodiments without departing from the scope of the disclosure. A part of the above-described exemplary embodiments can be appropriately combined with each other.

According to the above-described exemplary embodiments, the examples are described in which the processing is performed on an input image captured by the imaging apparatus such as a digital camera. However, the input image is not limited to the one captured by the digital camera. The input image may be an image obtained by, for example, a monitoring camera, various information terminals provided with a camera function such as a personal computer, a tablet terminal, a smartphone, and a portable game machine, a camcorder, an onboard camera, or an industrial camera.

The configurations and the processing in the flowcharts according to the above-described exemplary embodiments may be realized by a hardware configuration, or by a software configuration, for example, by the CPU executing a program according to the exemplary embodiments. Further, the above-described exemplary embodiments may be partially realized by the hardware configuration, and the rest may be realized by the software configuration. The program for the software configuration is not limited to the one prepared in advance. The program may also be obtained from a storage medium such as an external memory (not illustrated) or via a network (not illustrated).

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-167259, filed Sep. 13, 2019, which is hereby incorporated by reference herein in its entirety.

What is claimed is:

1. An image processing apparatus comprising:
a processor and a memory coupled to each other and to perform operations including:
setting target patch in an input image,
setting a small region near the target patch,
determining a number of similar patches to be detected, each being a patch similar to the target patch, based on a noise amount in the small region,
searching the input image for the determined number of similar patches to be detected,
performing noise reduction processing with respect to the target patch using the target patch and the similar patches, and
generating an image by synthesizing a plurality of patch groups subjected to the noise reduction processing.

2. The image processing apparatus according to claim 1, wherein said determining includes determining a search region to be searched for the similar patches based on the noise amount in the small region and a size of the target patch.

3. The image processing apparatus according to claim 1, wherein said determining includes determining the number of similar patches using the noise amount in the small region and auxiliary information.

4. The image processing apparatus according to claim 3,
wherein the auxiliary information is a ratio of the noise amount in the small region to a noise amount measured in advance for each sensitivity, and
wherein said determining includes determining a larger number of similar patches as the ratio becomes smaller.

5. The image processing apparatus according to claim 3,
wherein the auxiliary information is a value indicating an edge intensity in the small region, and
wherein said determining includes determining a larger number of similar patches as a value of the edge intensity becomes smaller.

6. The image processing apparatus according to claim 3,
wherein the auxiliary information is a representative value of a high-frequency component in a Fourier spectrum in the small region, and
wherein said determining includes determining a larger number of similar patches as the representative value becomes smaller.

7. The image processing apparatus according to claim 3,
wherein the auxiliary information is a differential value in the small region, and
wherein said determining includes determining a larger number of similar patches as the differential value becomes smaller.

8. The image processing apparatus according to claim 3,
wherein the auxiliary information is saturation of the target patch or the small region, and
wherein said determining includes determining a larger number of similar patches as the saturation becomes larger.

9. The image processing apparatus according to claim 8, wherein said determining includes separating a signal from the target patch or the small region into a luminance signal and a color difference signal and, in a case where noise reduction processing is performed on the luminance signal and the color difference signal, said determining includes determining a larger number of similar patches used for noise reduction processing on the color difference signal than the number of similar patches used for noise reduction processing on the luminance signal if the saturation, as calculated from the color difference signal, is a determination value or more.

10. A method for an image processing apparatus, the method comprising:
a processor and a memory coupled to each other and to perform operations including:
setting a target patch in an input image;
setting a small region near the target patch;
determining a number of similar patches to be detected, each being a patch similar to the target patch, based on a noise amount in the small region;
searching the input image for the determined number of similar patches to be detected;
performing noise reduction processing with respect to the target patch using the target patch and the similar patches; and
generating an image by synthesizing a plurality of patch groups subjected to the noise reduction processing.

11. The method according to claim 10, wherein determining includes determining a search region to be searched for the similar patches based on the noise amount in the small region and a size of the target patch.

12. The method according to claim 10, wherein determining includes determining the number of similar patches using the noise amount in the small region and auxiliary information.

13. The method according to claim 12,
wherein the auxiliary information is a ratio of the noise amount in the small region to a noise amount measured in advance for each sensitivity, and
wherein determining includes determining a larger number of similar patches as the ratio becomes smaller.

14. The method according to claim 12,
wherein the auxiliary information is a value indicating an edge intensity in the small region, and
wherein determining includes determining a larger number of similar patches as a value of the edge intensity becomes smaller.

15. The method according to claim 12,
wherein the auxiliary information is a representative value of a high-frequency component in a Fourier spectrum in the small region, and
wherein determining includes determining a larger number of similar patches as the representative value becomes smaller.

16. The method according to claim 12,
wherein the auxiliary information is a differential value in the small region, and
wherein determining includes determining a larger number of similar patches as the differential value becomes smaller.

17. The method according to claim 12,
wherein the auxiliary information is saturation of the target patch or the small region, and
wherein determining includes determining a larger number of similar patches as the saturation becomes larger.

18. The method according to claim 17, wherein determining includes separating a signal from the target patch or the small region into a luminance signal and a color difference signal and, in a case where noise reduction processing is performed on the luminance signal and the color difference signal, determining includes determining a larger number of similar patches used for noise reduction processing on the color difference signal than the number of similar patches used for noise reduction processing on the luminance signal if the saturation, as calculated from the color difference signal, is a determination value or more.

19. A non-transitory computer-readable storage medium storing a program to cause a computer to perform a method for an image processing apparatus, the method comprising:
a processor and a memory coupled to each other and to perform operations including:
setting a target patch in an input image;
setting a small region near the target patch;
determining a number of similar patches to be detected, each being a patch similar to the target patch, based on a noise amount in the small region;
searching the input image for the determined number of similar patches to be detected;
performing noise reduction processing with respect to the target patch using the target patch and the similar patches; and
generating an image by synthesizing a plurality of patch groups subjected to the noise reduction processing.

20. The non-transitory computer-readable storage medium according to claim 19, wherein determining includes determining a search region to be searched for the similar patches based on the noise amount in the small region and a size of the target patch.

* * * * *